United States Patent [19]

Dudley

[11] Patent Number: 4,905,923

[45] Date of Patent: Mar. 6, 1990

[54] DISPENSER TUBE HOLDER

[76] Inventor: Lawrence T. Dudley, 27696 Oregon Rd., Lot 40, Perrysburg, Ohio 43551

[21] Appl. No.: 173,649

[22] Filed: Mar. 25, 1988

[51] Int. Cl.⁴ .................. B65D 85/67; B65D 85/671
[52] U.S. Cl. .................. 242/55.53; 242/55.2; 242/55.3; 206/408
[58] Field of Search .................. 242/118.61, 55.53, 206/408, 52, 397, 59, 51, 407, 308, 316, 389, 386; 225/47; 411/412

[56] References Cited

U.S. PATENT DOCUMENTS

| | | |
|---|---|---|
| 1,676,854 | 7/1928 | Casterline . |
| 2,803,339 | 8/1957 | Kuchenbecker .................. 206/408 X |
| 2,822,084 | 2/1958 | Eilertsen . |
| 2,840,319 | 6/1958 | Danko .................. 242/55.3 |
| 3,228,519 | 1/1966 | Dong et al. . |
| 3,981,400 | 9/1976 | Quintana . |
| 4,329,099 | 5/1982 | Shimizu et al. .................. 411/412 |
| 4,444,313 | 4/1984 | Tyson . |
| 4,445,645 | 5/1984 | Byer . |
| 4,765,475 | 8/1988 | Kayserian .................. 242/55.53 X |
| 4,817,796 | 4/1989 | Camillo et al. .................. 206/408 X |

Primary Examiner—Donald Watkins
Attorney, Agent, or Firm—Sheldon & Mak

[57] ABSTRACT

A holder for rotatably retaining a roll dispenser tube in its carton includes a self-tapping screw for piercing opposite ends of the carton and engaging the inside of the tube. Each screw has a shallow head forming a thumbturn that occupies minimal space outside of the carton. In one configuration, the shank of each screw forms a sharp cone-shaped root surface having a first thread member extending from the apex to the head member, and a second thread member displaced 180: from the first and extending from the head toward the apex, but not necessarily reaching it.

11 Claims, 1 Drawing Sheet

U.S. Patent  Mar. 6, 1990  4,905,923
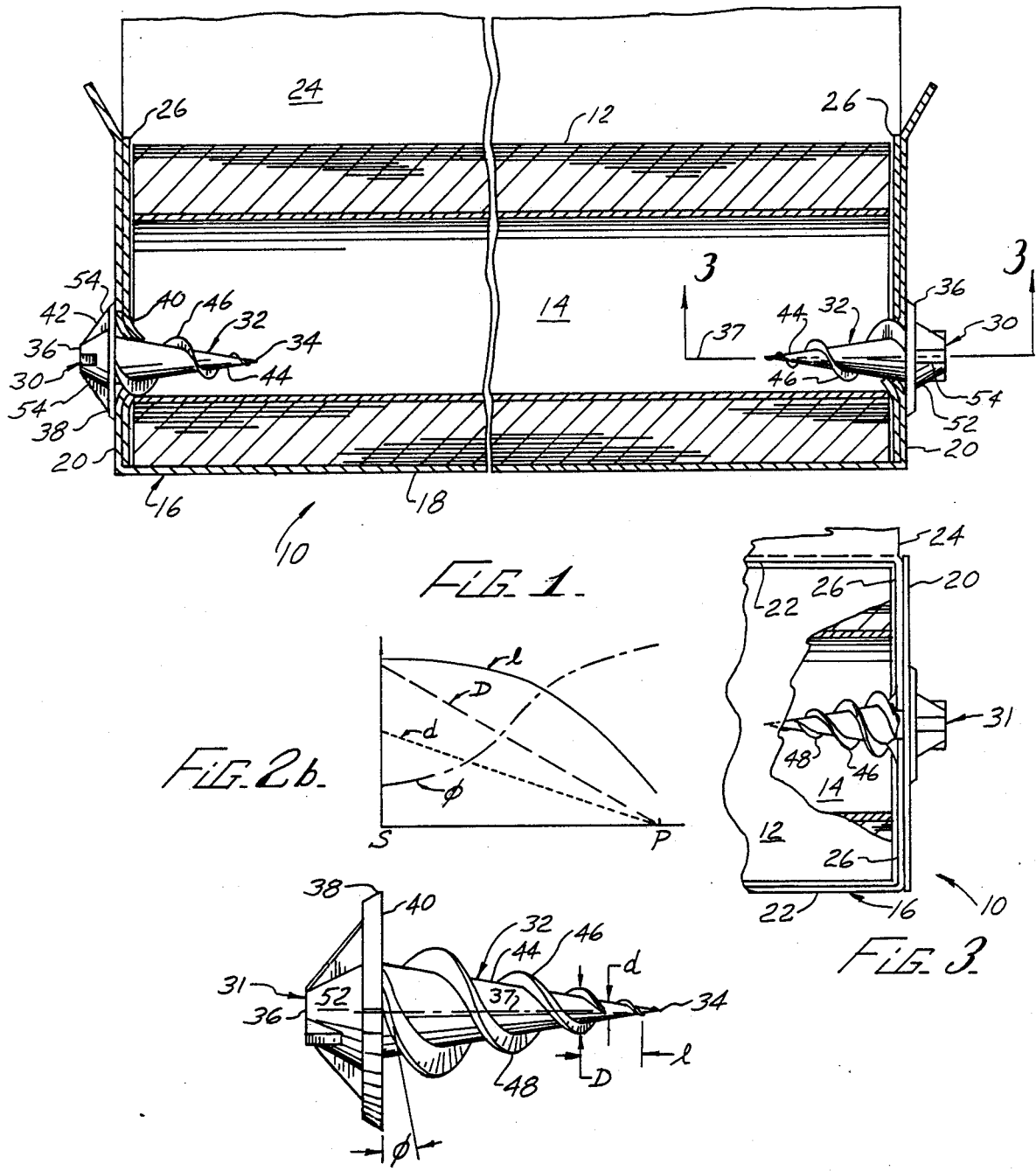

DISPENSER TUBE HOLDER

BACKGROUND

The present invention relates to dispensers of rolled sheet material such as aluminum foil, paper, plastic wrap and the like, and more particularly to means for keeping the roll properly located in the dispenser.

Sheet material for household and other use typically comes rolled on a tubular core within a carton, the carton having a lengthwise lid that is opened for threading the sheet from the carton. The lid is then closed with the end of the sheet extending from the carton and moveable against a cutting edge that is provided for severing a desired quantity of the material. In many cases, the lid must be at least partially opened for access to the remaining material.

A problem for many people is keeping the roll of material to be dispensed located within its carton. The roll is subject to falling out of the carton when the lid is opened, especially when an attempt is made to grasp the end of the sheet for drawing it out of the carton. This is not only aggravating, but some of the material is usually damaged. Moreover, it is dangerous in that one may be struck by the falling roll, and an attempt to catch the roll can result in injury. Also, the lid can come open when the carton is left in a drawer to be jostled about with other such cartons and miscellaneous items.

Devices for solving this problem have not been particularly successful for at least some of the following reasons:

1. They must be assembled from inside the dispenser, adding to the cost of producing the dispenser or requiring removal of the roll for assembly by the user. During such assembly, the above-described hazards remain.
2. They require special design features in the dispenser, adding to its cost.
3. They are subject to becoming dislodged from the dispenser.
4. They are not reuseable without tearing up the dispenser.

Thus there is a need for a holder for keeping a roll of sheet material properly located in its dispenser that works with conventional dispenser cartons without requiring removal of the roll, that securely attaches to the carton, that is easy to use and reuse, and is inexpensive to produce.

SUMMARY

The present invention meets this need by providing a pair of threaded retainers adapted for piercing opposite ends of a dispenser carton and rotatably engaging the inside of a roll tube therein. Each retainer includes a shank member having a pointed end, a head member fixed at the opposite end and having a shoulder for bearing against the carton and handle means for rotation of the shank member, and thread means on the shank member for advancing the shank member into the carton in engaging relation with the openings of the roll, the head member having an axial thickness that is less than a maximum diameter of the thread means. The pointed ends of the shank members can relatively easily be driven through opposite end walls of the carton, after which rotation of each head member advances the associated shank member to a rigidly fixed position within the opening, the shoulder of the head member bearing against the end wall for stabilizing the shank member.

The shank member can have a root surface forming a cone-shaped root portion with its apex at the first end of the shank member. Preferably the cone-shaped portion extends to the head member for progressively deforming the wall of the carton as the shank member advances therein, thereby enhancing the support of the retainer by the carton. The thread means can include a thread member extending outwardly from the root surface, the thread member preferably extending from proximate the first end of the shank member to proximate the head member. More preferably, the thread member joins the head member for enhancing support of the retainer by the container by pinching the carton between the thread member and the head member.

In a preferred configuration, the retainer includes two thread members displaced 180: about a shank axis of the shank member, one thread member extending the full length of the shank member, the other extending from proximate the head member toward, but preferably not to, the first end of the shank member.

The head member can have a disk-shaped member forming a shoulder for bearing against the carton, the handle means including a blade member extending perpendicular the disk member.

DRAWINGS

These and other features, aspects, and advantages of the present invention will become better understood with reference to the following description, appended claims, and accompanying drawings where:

FIG. 1 is a sectional elevational view of a roll dispenser carton equipped with roll retainer apparatus according to the present invention;

FIG. 2a is an elevational view showing in greater detail a dual-threaded variation of the retainer apparatus of FIG. 1;

FIG. 2b is a graph showing parameters relating to the apparatus of FIG. 1 relative to locations along what is shown in FIG. 2a; and FIG. 3 is a fragmentary sectional plan view along line 3—3 of FIG. 1, showing the carton with the dual-threaded variation of FIG. 2a.

DESCRIPTION

The present invention is directed to a roll dispenser tube holder method and apparatus that provides a convenient way to prevent the roll from falling out of the carton. With reference to the drawings, a roll dispenser 10 incorporating the present invention has a roll 12 of sheet material to be dispensed, the roll 12 having a cylindrically tubular core 14. The roll 12 is housed in a carton 16, the carton 16 having base wall 18, opposite upstanding end walls 20 extending from opposite ends of the base wall 18, opposite upstanding side walls 22 extending from opposite sides of the base wall 18, and an openable top wall 24 extending from one of the side walls 22. Typically, each end wall 20 is connected to the side walls 22 by a pair of end tabs 26, each end tab 26 extending from the respective side wall 22 to proximate the midpoint of the end wall 20, a suitable glue or other bonding agent being used between the tabs 26 and the end walls 20.

According to the present invention, a pair of screw retainers 30 protrude the end walls 20 of the carton 16 for holding the roll 12 within the carton 16 without reliance upon closure of the carton 16 by the top wall 24 thereof. Each retainer 30 includes a threaded shank member 32, one end thereof forming a sharp point 34; and a head member 36 at the other end. The head member 36, which is rigidly connected concentric with a shank axis 37 of the shank member 32, incorporates a disk-shaped portion 38, one side of which forms a shoulder 40 for bearing against one of the end walls 20. The head portion 36 also incorporates a low-profile thumbturn 42 that is described more fully below.

In an exemplary configuration of the present invention, the shank member 32 has a cone-shaped root portion 44, the apex thereof forming the point 34, and at least a first thread member 46, the first thread member 46 extending generally helically from proximate the point 34 to proximate the shoulder 40 and having a major diameter D, a minor diameter d, and a helix angle $\phi$ and associated lead 1, the helix angle $\phi$ and the lead 1 each being measured at the major diameter D.

As shown most clearly in FIGS. 2a and 2b, none of the lead 1, the helix angle $\phi$, the major diameter D, and the minor diameter d is necessarily uniform along the shank member 32. FIG. 2b shows 1, $\phi$, D, and d plotted between S, corresponding to the shoulder 40, and P, corresponding to the point 34 on the retainer 30. In the present invention, it is preferred that both D and d smoothly increase and $\phi$ smoothly decrease along the shank member 32 from P to S for providing a desired combination of ease in penetrating the carton 16, ease and stability in maintaining the axis of the shank member 32 aligned perpendicular to the end wall 20 during the penetration, a high mechanical advantage in drawing the shoulder 40 against the carton 16, and high-strength of engagement of the retainer 30 with the end wall 20 for rigidly and securely holding the roll 12 rotatably within the carton 16. The increase in D and d from the point 34 advantageously increasingly upsets the material of the carton 16 as the shank member 32 advances therein for increasingly tight engagement as well as an increasing diameter of engagement as the head member approaches contact with the carton 16. The relatively high helix angle $\phi$ proximate the point 34 facilitates rapid advancement of the shank member 32 following the initial penetration when the material of the carton 16 is being minimally upset. The relatively low helix angle $\phi$ proximate the shoulder 40 provides a high mechanical advantage in advancing the shank member 32 by rotation of the head member 36, especially where it is most needed, namely at the point of contact between the shoulder 40 and the end wall 20. The low helix angle $\phi$ proximate the shoulder 40 further provides a locking frictional engagement of the retainer 30 with the carton 16 when the shoulder 40 is drawn tightly against the end wall 20 thereof. The lead 1 increases relatively rapidly from the point 34 along the shank member 32 toward the shoulder 40 by virtue of the increasing major diameter D. However, the major diameter D increases at a lesser rate relative to itself in locations along the shank member 32 closest to the shoulder 40, so that in a preferred configuration of the retainer 30, the lead 1 increases less rapidly as the helix angle continues to decrease in the vicinity of the shoulder 40. Moreover, it is preferred that the first thread member 46 extend to and be joined with the disk-shaped portion 38 of the head member 36 for enhancing the ability of the material of the carton 16, though being upset by the penetration, to be securely jammed between the first thread member 46 and the shoulder 40.

As shown in FIGS. 2a and 3, a preferred configuration of the retainer 30 includes a second thread member 48 that is axially displaced on the shank member 32 such that corresponding portions thereof at a single point along the shank axis 37 are angularly displaced approximately 180° about the shank axis 37. The second thread member 48 provides a twofold advantage in that not only is there greater strength and stability in the threaded engagement of the shank member 32 with the carton 16, but the engagement is symmetrical about the shank axis 37. This means that the forces reacting to the penetration of the end wall 20 by the retainer 31 are balanced about the shank axis 37, a user not being required to exert substantial overturning moments in a direction perpendicular to the shank axis 37 in order to keep the axis 37 approximately perpendicular to the end wall 20.

As shown in FIG. 1, the thumbturn 42 has a low profile for minimal interference with storage of the dispenser 10, yet the retainer 30 can easily and securely be installed without tools. The thumbturn 42 includes a body portion 52 extending from the disk-shaped member 38 and rigidly located concentric with the shank axis 37 on the head member 36, and blade means 54 extending symmetrically on opposite sides of the body portion 52. The combination of the body portion and the outwardly extending blade means facilitate the maintenance of the retainer 30 with the shank axis 37 approximately perpendicular to the end wall 20 during the penetration by the shank member 32. Also, it is easy to apply considerable axial force on the head member 36 toward the carton 16 while turning the head member 36 against significant torsional resistance and at the same time maintaining the axial alignment.

In an exemplary configuration of the present invention for use with typically encountered roll dispensers, the length of the shank member 32 from the point 34 to the shoulder 40 is from about 20 mm to about 35 mm; the root diameter d at the shoulder 40 is from about 5 mm to about 10 mm, preferably about 8 mm; and the diameter of the disk-shaped member 38 is from about 24 to about 32 mm. Preferably the disk-shaped member has an axial thickness of not more than about 2 mm, and the head member 36 has an overall axial thickness of not more than about 10 mm. The body portion 52 of the thumbturn 42 has an outside diameter of about 10 mm at the disk-shaped member 38, tapering to about 5 mm in diameter at the axial extremity of the head member 36.

The retainer 30 can be fabricated from any material having sufficient strength, configured according to the present invention, for penetrating the material of the dispenser 10. For ease of manufacture, the retainer 30 is preferably made of molded plastic, suitable materials being polyethylene, polypropylene and acetal resins.

Although the present invention has been described in considerable detail with reference to certain preferred versions thereof, other versions are possible. For example, there can be three or more of the thread members, spaced about the shank axis 37. Therefore, the spirit and scope of the appended claims should not necessarily be limited to the description of the preferred versions contained herein.

What is claimed is:

1. An apparatus for rotatably holding a tubular roll within a dispenser carton, the roll having circular openings at opposite ends, the openings being concentric with an axis of rotation of the roll, the apparatus comprising a pair of retainers each comprising:

(a) a shank member having first and second ends and a shank axis extending therebetween, the first end being pointed for piercing an end wall of the carton;

(b) thread means on the shank member for advancing the shank member into the carton by engagement with the pierced wall of the carton during rotation of the shank member on its axis, the thread means having a maximum diameter relative to the shank axis;

(c) a head member rigidly attached to the second end of the shank member, the head member having a shoulder for bearing against the carton and handle means for rotation of the shank member, the shoulder extending perpendicular to the shank axis beyond the maximum diameter of the thread means, wherein the axial thickness of the head member, including the handle means, is less than the maximum diameter of the thread means, whereby, when the shank member protrudes the carton into one of the openings of the roll, the corresponding end of the roll is rotatably retained within the carton by direct contact between the roll and the shank member.

2. The apparatus of claim 1 wherein the shank member comprises a root surface having a cone-shaped portion with an apex at the first end of the shank member.

3. The apparatus of claim 2 wherein the cone-shaped portion of the root surface extends to the head member.

4. The apparatus of claim 2 wherein the thread means comprises a thread member extending outwardly from the root surface.

5. The apparatus of claim 4 wherein the thread member is a first thread member extending from proximate the first end of the shank member to proximate the head member.

6. The apparatus of claim 5 wherein the thread member joins the head member.

7. The apparatus of claim 5 further comprising a second thread member extending outwardly from the root surface and from proximate the head member toward the first end of the shank member, the second thread member being displaced about 180: from the first thread member about the shank axis.

8. The apparatus of claim 1 wherein the thread means comprises a thread member extending from proximate the first end of the shank member to proximate the head member.

9. The apparatus of claim 1 wherein the head member comprises a disk-shaped member forming the shoulder for bearing against the carton, and the handle means comprises a blade member extending perpendicular to the disk-shaped member.

10. An apparatus for rotatably holding a tubular roll within a dispenser carton, the roll having circular openings at opposite ends, the openings being concentric with an axis of rotation of the roll, the apparatus comprising:

(a) a shank member having first and second ends and a shank axis extending therebetween, the first end being pointed for piercing an end wall of the carton, the shank member forming a cone-shaped root surface with an apex at the first end of the shank member;

(b) thread means on the shank member for advancing the shank member into the carton by engagement with the pierced wall of the carton during rotation of the shank member on its axis, comprising first and second thread members each extending outwardly from the root surface and having a maximum diameter relative to the shank axis, the second thread member being displaced about 180° from the first thread member about the shank axis;

(c) a head member rigidly attached to the second end of the shank member, the head member comprising:

(i) a disc-shaped member joining the cone-shaped portion of the root surface and forming a shoulder for bearing against the carton, the shoulder extending perpendicular to the shank axis beyond the maximum diameter of the thread means, the first thread member extending from proximate the first end of the shank member and joining the shoulder, the second thread member extending from the shoulder toward the first end of the shank member; and (ii) handle means for rotation of the shank member, the handle means comprising a blade member extending perpendicular to the disk-shaped member, wherein the axial thickness of the head member, including the handle means, is less than the maximum diameter of the thread means, whereby, when the shank member protrudes the carton into one of the openings of the roll, the corresponding end of the roll is rotatably retained within the carton by direct contact between the roll and the shank member.

11. The apparatus of claim 4 wherein the shank member has a length of from about 20 mm to about 35 mm, the cone-shaped portion has a maximum diameter of from about 5 mm to about 10 mm, and the shoulder of the head member has a diameter of at least about 24 mm.

* * * * *